(12) United States Patent
Gallagher

(10) Patent No.: US 6,940,546 B2
(45) Date of Patent: Sep. 6, 2005

(54) METHOD FOR COMPENSATING A DIGITAL IMAGE FOR LIGHT FALLOFF WHILE MINIMIZING LIGHT BALANCE CHANGE

(75) Inventor: Andrew C. Gallagher, Brockport, NY (US)

(73) Assignee: Eastman Kodak Company, Rochester, NY (US)

(*) Notice: Subject to any disclaimer, the term of this patent is extended or adjusted under 35 U.S.C. 154(b) by 837 days.

(21) Appl. No.: 09/826,108

(22) Filed: Apr. 4, 2001

(65) Prior Publication Data

US 2003/0007707 A1 Jan. 9, 2003

(51) Int. Cl.⁷ .............................................. H04N 9/73
(52) U.S. Cl. ................................ 348/224.1; 348/251
(58) Field of Search ........................... 348/224.1, 251

(56) References Cited

U.S. PATENT DOCUMENTS

| | | | |
|---|---|---|---|
| 4,945,406 A | | 7/1990 | Cok ............................ 358/80 |
| 5,343,302 A | * | 8/1994 | Yamashita ................... 348/251 |
| 5,461,440 A | | 10/1995 | Toyoda et al. .............. 354/106 |
| 6,323,934 B1 | * | 11/2001 | Enomoto ....................... 355/40 |
| 6,670,988 B1 | * | 12/2003 | Gallagher et al. ........ 348/224.1 |

OTHER PUBLICATIONS

U.S. Appl. No. 09/293,197, filed Apr. 16, 1999, Andrew C. Gallagher et al.
U.S. Appl. No. 09/643,544, filed Aug. 22, 2000, Andrew C. Gallagher et al.
U.S. Appl. No. 09/626,882, filed Jul. 27, 2000, Andrew C. Gallagher.

* cited by examiner

*Primary Examiner*—Tuan Ho
*Assistant Examiner*—Heather R. Long
(74) *Attorney, Agent, or Firm*—David M. Woods

(57) ABSTRACT

An image processing method for compensating for light falloff in a digital image provides individual compensation values to correct light falloff in the image pixels of an input digital image; however, the individual compensation values induce a balance change in the digital image. Therefore, a balance value is determined for correcting the balance change of the digital image and the individual compensation values and the balance value are applied to the pixels of the input digital image to provide a corrected image having compensation for light falloff with minimal change to the light balance.

18 Claims, 7 Drawing Sheets

METHOD FOR COMPENSATING A DIGITAL IMAGE FOR LIGHT FALLOFF WHILE MINIMIZING LIGHT BALANCE CHANGE

FIELD OF THE INVENTION

The invention relates generally to the field of digital image processing and, more particularly, to digital image processing for compensating a digital image for light falloff while preserving the balance of the digital image.

BACKGROUND OF THE INVENTION

Lenses produce non-uniform exposure at their focal plane when imaging a uniformly lit surface. For instance, the light from a uniformly lit gray wall perpendicular to the optical axis will pass through a lens and form an image that is brightest at the center and dims radially. When the lens is an ideal thin lens, the intensity of light in the image will form an intensity pattern described by $\cos^4$ of the angle between the optical axis of the lens and the point in the image plane. The visible effect of this phenomena is referred to as falloff.

In addition, other factors such as flash falloff and vignetting contribute to the falloff phenomena, which is often visible in an image. Vignetting is a property that describes the loss of light rays passing through an optical system. Flash falloff is a phenomenon inherent in the directional illumination of a nearby, artificial illuminant.

Several examples exist in the prior art which teach methods of compensating an image for the falloff that occurred at the time of capture. In U.S. Pat. No. 5,461,440, Toyoda et al describe a method of recording a camera identification code onto the film upon which the image is also captured. This identification code specifies the lens information (focal length, focus position, and aperture value). During digital processing, the identification code is translated by a look-up-table to a required level of correction which is applied to the image.

However, it is not always practical or possible to record such information onto photographic film. Consequently, the need exists to compensate for levels of lens falloff in a captured scene with less knowledge about the camera's optical system at the time of image capture.

Additionally, in commonly assigned, copending U.S. Ser. No. 09/293,197 ("A Method for Compensating Digital Images for Light Falloff and an Apparatus Therefor"), which is incorporated herein by reference, Gallagher and Gindele describe a method for applying a falloff compensation to a digital image. The compensation is performed by determining an individual compensation value for each pixel of the digital image, based upon a falloff compensation function and a falloff correction parameter. However, while the falloff compensation taught by Gallagher and Gindele successfully corrects for the falloff in the digital image, the corrected digital image consistently appears lighter then the original digital image. This is an undesirable side effect of the compensation. For example, if a digital image which appeared to have the proper balance were compensated for falloff, the compensated digital image would appear too light. Furthermore, the degree of the lightness of the corrected digital image is dependent upon the falloff compensation function and the falloff correction parameter.

Consequently, a need exists for overcoming the above-described drawbacks. More specifically, a need exists for applying a falloff compensation to a digital image in such a manner that the balance of the compensated digital image is similar to that of the original digital image.

SUMMARY OF THE INVENTION

It is the object of the present invention to provide a method directed to overcoming one or more of the problems as set forth above. Briefly summarized, according to one aspect of the present invention, the invention resides in an image processing method for compensating for light falloff in a digital image comprising the steps of: providing an input digital image comprised of image pixels; providing individual compensation values to correct light falloff of the image pixels, whereby the individual compensation values induce a balance change in the digital image; determining a balance value for correcting the balance change of the digital image; and applying the individual compensation values and the balance value to the pixels of the input digital image to provide a corrected image having compensation for light falloff with minimal change to the light balance.

In a further aspect of the invention, the step of providing individual compensation values comprises the steps of providing falloff compensation information which varies depending on location within the digital image, and using the falloff compensation information to generate individual compensation values for said one or more pixels. Alternatively, the step of providing individual compensation values may comprise the steps of providing a falloff compensation mask which varies depending on location within the digital image, and using the falloff compensation mask to generate individual compensation values for said one or more pixels. The step of determining a balance value uses either the falloff compensation information or the falloff compensation mask to determine the balance value.

The principal advantage of the invention is that a falloff compensation may be applied to a digital image in such a manner that the balance of the compensated digital image is similar to that of the original digital image, which results in a much more pleasing effect.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing methods and systems employing various forms of image compensation are well known, the present description will be directed in particular to attributes forming part of, or cooperating more directly with, the method in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
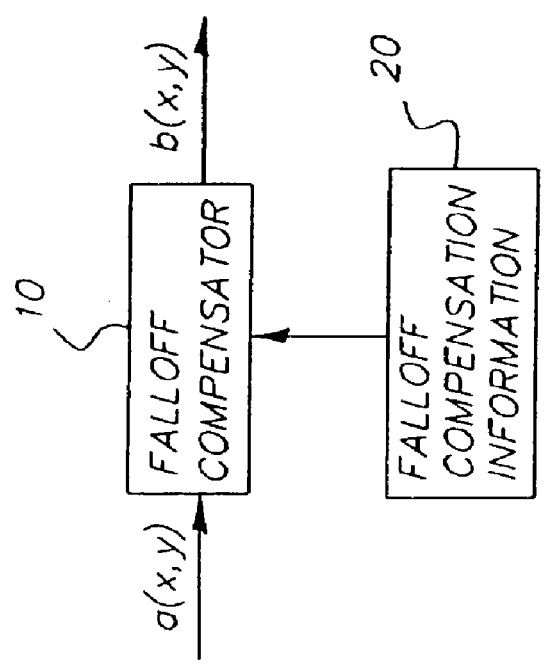
FIG. 1 is a block diagram of a prior art method of performing falloff compensation.

Referring to FIG. 1, there is illustrated an overview of the method for performing falloff compensation found in the prior art. It is instructive to note that the present invention typically utilizes a digital image that is a two-dimensional array of red, green, and blue pixel values, or an array of monochrome pixel values corresponding to light intensities. The digital image is in the form of digital image data, which is used for further processing. A digital camera (not shown) may be the source for the digital image. Alternatively, the digital image may be generated by scanning a conventional photographic film like the Advanced Photo System (APS) film, 35 mm film or any other film format. In practice, therefore, at least one film frame of a roll of film is subjected to a digitizing means in order to capture a digital image. Alternatively, the digital image may be generated by scanning another image, such as a hard-copy image. In each case, the digital image data is fed to a falloff compensator. After the compensation of the falloff, a rendering means forms a final image, that is, a falloff-compensated image, which is ready for displaying or printing.

The metric of the image data described by this invention is assumed to be log exposure. An alternative embodiment of the present invention may be implemented if the metric of the image data of the input image is in fact linearly related to exposure. If the image data of the digital image is not logarithmically related to exposure, then the image may be converted to a metric related to log exposure with a transformation. Such transformations used to convert from one metric to another are well known in the art of image processing.

As described in many texts on the subject of optics, ideal thin lenses produce non-uniform exposure at the focal plane when imaging a uniformly illuminated surface.

The light falloff may have its origin in a lens falloff and, if a flash is used during picture taking, also in a flash falloff.

The light falloff in the digital image is compensated by carrying out alterations on the pixel values of the digital image. At first, a plurality of pixel values corresponding to at least part of a digital image is provided to the compensator. As mentioned above, various roll film types (Advanced Photo System or 35 mm) or digital image sources such as digital cameras or scanners may be used as the source of the digital image.

As shown in FIG. 1, a known falloff compensator 10 receives falloff compensation information 20 for the purpose of determining and applying an individual compensation value to each pixel of the digital image. Assuming that the digital image is in a metric proportional to log exposure, the individual compensation value is a value that is added to each pixel of the digital image. The digital image input to the falloff compensator 10 is represented as a(x,y) where 0<=x<r and 0<=y<c and r and c are the number of rows and columns, respectively, in the digital image. Any single sample of the digital image $a(x_o, y_o)$ represents a single pixel of the digital image. The collection of individual compensation values is represented as fcm(x,y) and is referred to as a falloff compensation mask. Thus, the individual compensation values vary depending on the location (x,y) within the digital image. In fact, if the fcm(xy) is constant (does not vary on the basis of position), then the falloff compensator 10 will not correct the digital image a(x,y) for its falloff. In the case where the digital image is represented in a metric proportional to log exposure, the falloff compensator 10 preferably adds each individual compensation value to its corresponding pixel in the digital image. This application may be represented by the equation:

$$b(x,y)=a(x,y)+fcm(x,y) \qquad \text{Eq.(1)}$$

where b(x,y) represents the corrected digital image. Notice that if the digital image a(x,y) is composed of multiple colors at each (x,y) pixel location, then the individual compensation value fcm(x,y) is preferably combined with each color of the digital image a(x,y). Those skilled in the art will readily recognize that if the digital image a(x,y) is represented in a metric proportional to exposure (rather than log exposure) then the equation used to generate the corrected digital image by the falloff compensator 10 is:

$$b(x,y)=a(x,y)*fcm(x,y) \qquad \text{Eq.(2)}$$

Throughout this detailed description, it should be assumed that the metric of the digital image is proportional to log exposure. Those skilled in the art will easily be able to translate the described method for other metrics, such as a metric proportional to exposure or a gamma metric. In regard to this detailed description, it is noted that a portion of a digital image is itself a digital image.

The falloff compensator 10 is supplied with falloff compensation information 20 from which the individual compensation values are derived. The falloff compensation information 20 may be of several forms. In a first case, the falloff compensation information 20 may simply be a falloff compensation mask of the same dimensions as the digital image. In this case, the corrected digital image may be readily calculated by implementing Equation 1. The falloff compensation mask may be created externally by any of several methods, for example by evaluating an equation or by scanning a target. In a second case, the falloff compensation mask may have different dimensions than the digital image. This is often the case when a device can receive multiple resolutions of image input, or when it is desirable to store a low resolution falloff compensation mask. In this second case, the falloff compensation mask may be interpolated and/or cropped so that it contains the same number of rows and columns as the digital image. In a third and preferable case, a falloff compensation function and the appropriate parameter values are supplied to the falloff compensator 10. The falloff compensator 10 then evaluates the falloff compensation function using the supplied parameter values for each of the pixel locations in the digital image. In the preferred implementation from the prior art (which is described in commonly assigned, copending U.S. Ser. No. 09/626,882, "A Method and System for Automatically Determining a Level of Light Falloff in an Image", filed Jul. 27, 2000, which is incorporated herein by reference), Gallagher describes the following falloff compensation function, which is provided to the falloff compensator:

$$fcm(x, y) = \frac{4^* cvs}{\log 2} \log\left(\cos\left(\tan^{-1}\left(\frac{d}{f}\right)\right)\right) \quad \text{Eq. (3)}$$

where d is the distance in pixels from the (x,y) position to the center of the digital image and cvs is the number of code values per stop of exposure (cvs indicates scaling of the log exposure metric, and in the preferred implementation is 188). The parameter f represents the focal length of a lens (in pixels) for which the falloff compensator will correct the falloff.

The variable f may further be calculated by the following formula:

$$f = \frac{d_{max}}{\tan(\cos^{-1}(10^{-0.25 f_c \log 2}))} \quad \text{Eq. (4)}$$

where $d_{max}$ is the distance from location (0,0) (or any corner of the digital image) to the center of the digital image in pixels. Distances d and $d_{max}$ may be calculated as:

$$d = \sqrt{\left(x - \frac{r}{2}\right)^2 + \left(y - \frac{c}{2}\right)^2} \quad \text{Eq. (5)}$$

$$d_{max} = \sqrt{\left(\frac{r}{2}\right)^2 + \left(\frac{c}{2}\right)^2} \quad \text{Eq. (6)}$$

Variable $f_c$ then represents the single free parameter of the falloff compensation mask fcm(x,y). This correction parameter $f_c$ refers to the number of stops of correction applied to a corner pixel of the digital image relative to the center. Thus, the value of fcm(x,y) at the center of the digital image (fcm(r/2, c/2)) will be 0 and the value of fcm at a corner of the digital image (for example fcm(0,0)) will be $f_c$*cvs. Thus, by supplying a falloff compensation function (preferably described by Equations (3)–(6)) and the appropriate parameter values $f_c$, the falloff compensator 10 can determine the individual compensation value. Note that when implementing Equation (1) to create the corrected digital image, the entire falloff compensation mask may never exist at a single moment in time. The aforementioned commonly assigned, copending U.S. Ser. No. 09/293,197 describes a variety of methods and attributes of the photographic system upon which to base the selection of $f_c$. Additionally, the aforementioned commonly assigned, copending U.S. Ser. No. 09/626,882 describes a method of automatically selecting the value of $f_c$.

Figure 2:
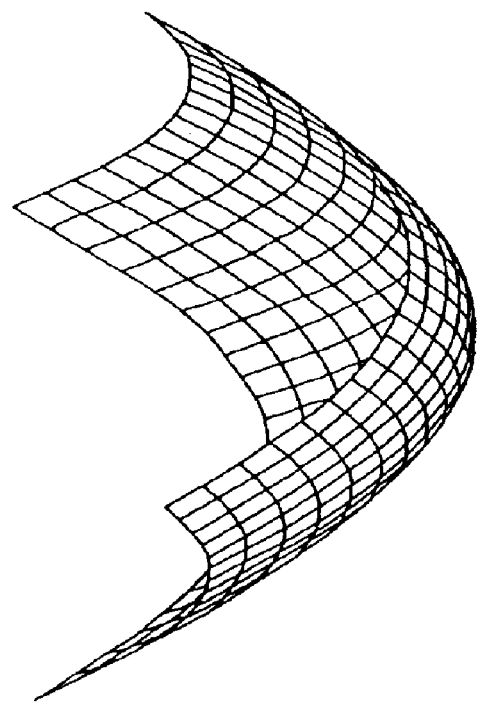
FIG. 2 is a three dimensional graphical representation of a falloff compensation mask of the type provided by the known method shown in FIG. 1.

FIG. 2 illustrates a graphical example of a falloff compensation mask as would be known in the prior art. Notice that the minimum value occurs in the center and the maximum value occurs in one of the corners of the mask. The application of such a falloff compensation mask as described in Eq. (1) will accordingly correct the digital image for falloff.

Figure 3A:
FIG. 3A shows a digital image in need of falloff compensation.
Figure 3B:
FIG. 3B shows an unnaturally light digital image, as corrected by the method of the prior art.

FIG. 3A illustrates an example of a digital image with falloff. FIG. 3B shows the corrected digital image output from the falloff compensator 10 using Eq. (1) with the falloff function described by Eqs. (3) to (6) and a value of $f_c$=3.5. Notice that the corrected digital image is apparently free of falloff and exhibits an even illumination. However, the corrected digital image in FIG. 3B appears light in balance. Notice that since the minimum value of the falloff compensation function is 0, the mean value of fcm(x,y) is greater then 0. Thus, the average value of the corrected digital image is greater then the average value of the digital image. In other words, the application of the falloff compensation mask to the digital image by the falloff compensator 10 modified its balance. This is an undesirable attribute of the falloff compensation.

Figure 4:
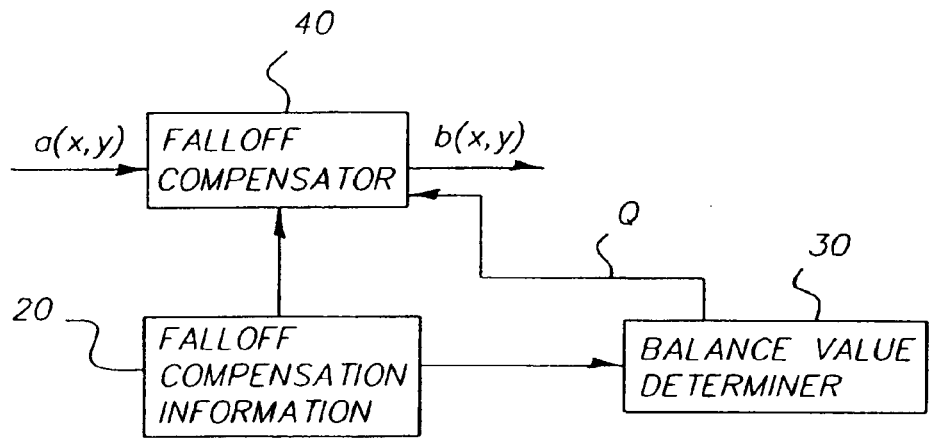
FIG. 4 is a block diagram of the present invention for performing a falloff compensation while minimizing changes to the balance of the digital image.

Referring now to FIG. 4, the falloff compensation described above is modified according to the invention to correct for the balance problem caused by the falloff compensation, as also described above. More specifically, FIG. 4 illustrates a method by which a falloff compensator may apply a fall off compensation to a digital image while minimizing the balance difference between the original digital image and the corrected digital image.

As before, a fall off compensator 40 inputs a digital image in need of falloff compensation, as well as falloff compensation information 20. Additionally, the falloff compensator 40 inputs a balance value Q, which counteracts the balance change induced by the falloff compensation as described hereinabove. The balance value Q is not dependent on position within the digital image a(x,y). In the preferred embodiment, the falloff compensator 40 performs the falloff compensation by applying the balance value and the individual compensation value to each pixel of the digital image according to the following Equation (rather than Equation (1)):

$$b(x,y) = a(x,y) + fcm(x,y) + Q \quad \text{Eq.(7)}$$

If the image a(x,y) is represented in an exposure metric, then the Q would represent a multiplicative factor rather than an additive term as shown in Eq. (7).

The balance value Q is determined by an analysis of the falloff compensation information 20. The balance value determiner 30 inputs the falloff compensation information 20 and outputs the balance value Q. Many methods may be used to determine the balance value Q from the falloff compensation information 20. In the preferred embodiment, the balance value Q is determined by the following equation:

$$Q = -\frac{100}{Src} \sum_{i=-0.5r(1-C/\sqrt{S})}^{0.5r(1-0.1\sqrt{S})} \sum_{j=-0.5c(1-0.1\sqrt{S})}^{0.5c(1-0.1\sqrt{S})} fcm\left(\frac{r}{2} + i, \frac{c}{2} + j\right), \quad \text{Eq. (8)}$$

when $S > 0$ $$Q = -fcm\left(\frac{r}{2}, \frac{c}{2}\right), \text{ otherwise}$$

Figure 5:
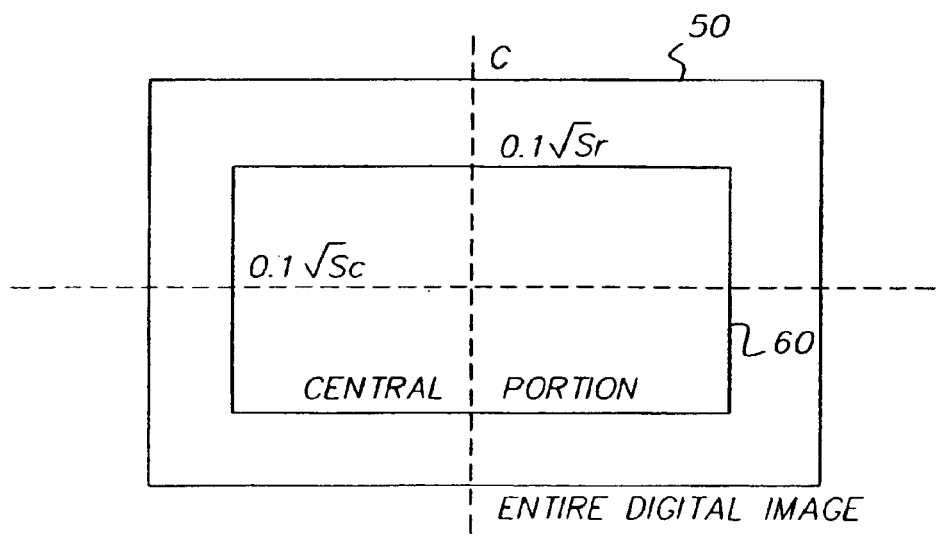
FIG. 5 illustrates the central portion of an entire digital image, which is used in performing a falloff compensation while minimizing changes to the balance of the digital image.

In this equation, the balance value Q is a negative of the central portion 60 shown in FIG. 5 of the falloff compensation mask fcm(x,y). There are several reasons for this selection of Q. First, the application of the falloff compensation mask with this selection of Q ensures that the mean of the central portion 60 of the digital image and the corrected digital image will be equal. Also, assuming that the subject of an image tends to be near the center, preserving the mean of the central portion of the image is a logical step towards preserving the balance. The variable S is the size of the central portion 60 expressed as a percentage of pixels of the entire digital image 50 that are within a central portion 60, as shown in FIG. 5. Notice that when S=100, Q is equal to the mean of fcm(x,y).

Figure 6:
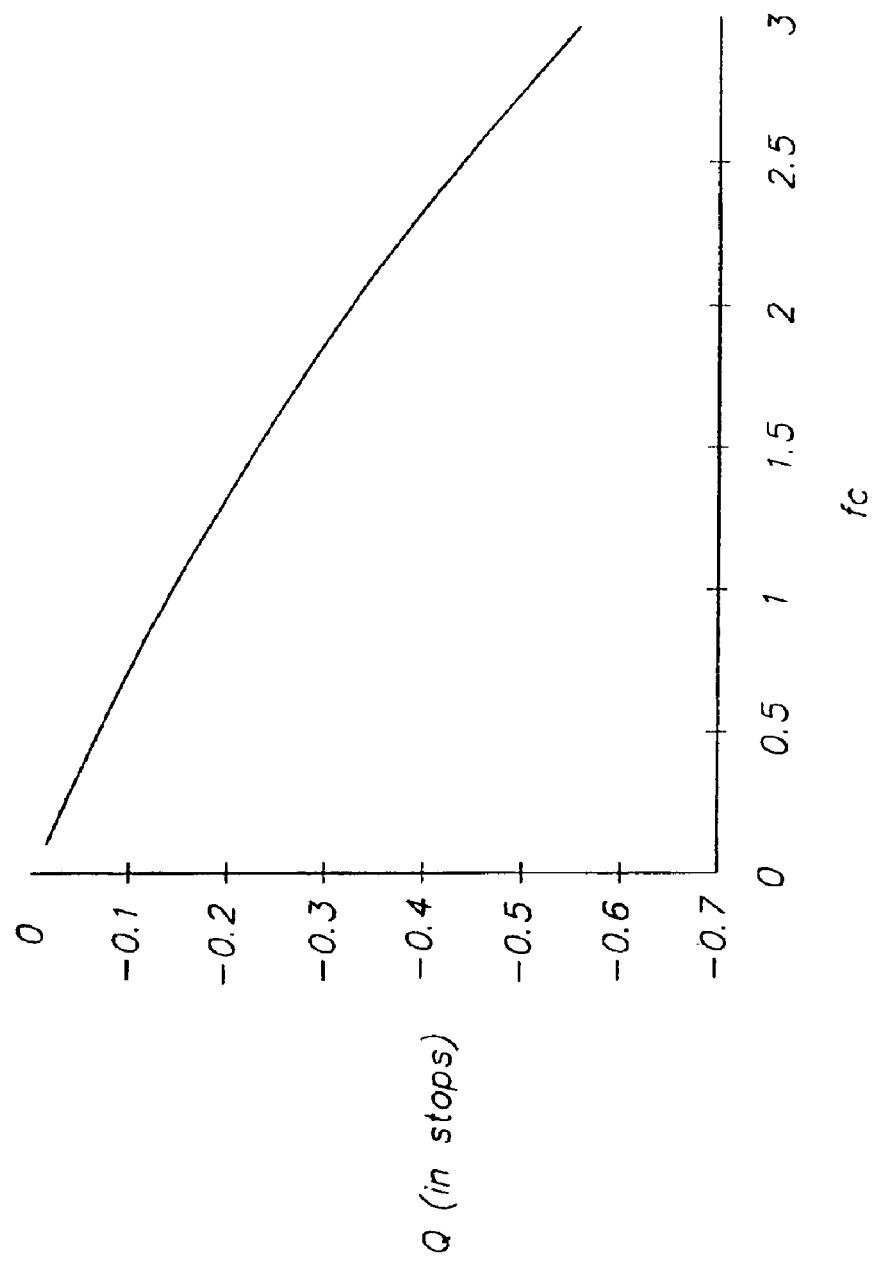
FIG. 6 illustrates the relationship between a balance value Q calculated according to the present invention and a compensation correction parameter $f_c$.

The preferred value of S is 35. This value of S is optimal independent of the value of $f_c$, indicating that the selection of Equation (8) for Q, which is implemented by the balance value determiner 30, is a good one. A graph of the value of the balance value Q for a selection of values of the compensation correction parameter $f_c$ is shown in FIG. 6. Notice that the value of Q is always negative. Additionally, Q is monotonic and decreases as $f_c$ increases.

As an alternative embodiment, those skilled in the art of algebra will recognize that the same constant Q can be derived by creating a corrected digital image according to the method shown in FIG. 1 and Equation (1). Q can be found be taking the difference of the means of the central portions of the digital image and the corrected digital image output from the falloff compensator 10. Note that although this method is less efficient than the preferred embodiment, the resulting computed value of Q is the same. The balance value Q could then be applied to the corrected digital image output from the falloff compensator 10 to produce an image equivalent to the digital image output from the falloff compensator 40 using the preferred embodiment of the present invention. Such deviations are equivalent to the described present invention; they clearly produce a similar effect to the preferred embodiment and are intended to be within the scope of the present invention.

Figure 7A:
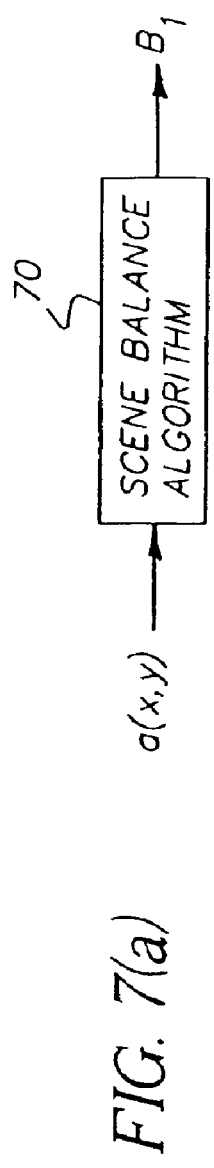
FIG. 7A shows a first path for determining an image balance $B_1$.
Figure 7B:
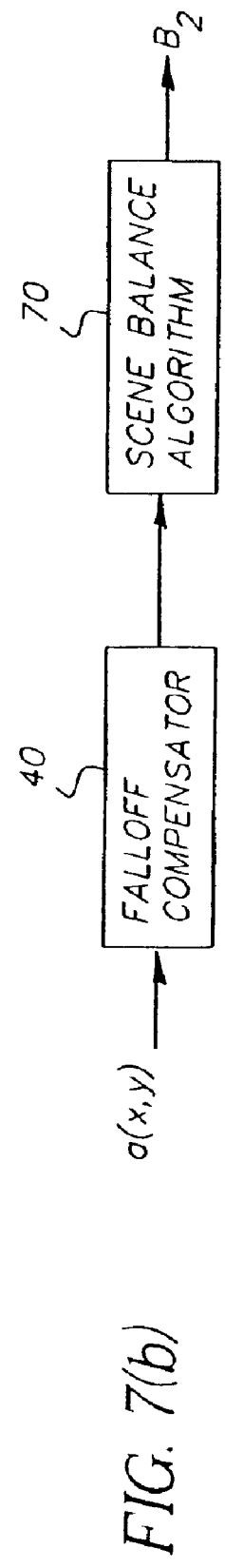
FIG. 7B shows a second path for determining an image balance $B_2$.

FIGS. 7A and 7B illustrate the method by which it was determined that the preferred value of S is 35. Two processing paths were compared. The first processing path, shown in FIG. 7A, shows a digital image a(x,y) input to a scene balance algorithm 70 for identification of the image balance. A scene balance algorithm 70 performs an analysis of a digital image and determines a first image balance $B_1$. An example scene balance algorithm is described in commonly assigned U.S. Pat. No. 4,945,406 issued Jul. 31, 1990 to D. Cok, entitled "Apparatus and Accompanying Methods for Achieving Automatic Color Balancing in a Film to Video Transfer System", which is incorporated herein by reference.

In a second processing path, shown in FIG. 7B, a digital image is input to the falloff compensator 40 to produce a corrected digital image. The digital image is then input to an identical scene balance algorithm 70, which outputs a second image balance $B_2$. If the process of compensating for the falloff as performed by the falloff compensator 40 did not modify the balance of the digital image, then $B_1$ would be substantially equal to $B_2$. Thus, the value of S is modified until the difference between $B_1$ and $B_2$ is minimized over a large population of images. Additionally, value of S was modified until the difference between $B_1$ and $B_2$ was minimized over multiple values of $f_c$. Based on that analysis, the optimal value of S was determined to be 35 for various values of $f_c$. However, it should be understood that other values of S, for example, values of S corresponding to between 25% and 45% of the image, will work satisfactorily, and the invention is not limited to a particular value of S.

Notice that the present invention describes a method of applying a falloff compensation to an image without modifying the image balance. Essentially, the end result is similar to the path of FIG. 7B, where a scene balance algorithm 70 is applied to the output of a falloff compensator 40. However, the advantage of the present invention is that an additional step, the scene balance algorithm 70 is not required.

Figure 8:
FIG. 8 shows a corrected digital image produced by the method of the present invention.

Finally, as a testament to the effectiveness of the present invention, and as compared to the images shown in FIGS. 3A and 3B, FIG. 8 shows the corrected digital image generated with the method of the present invention (that is, as shown by FIG. 4 and Equations (7) and (8)) where the falloff compensation is implemented by the falloff compensator 40 in such a manner as to leave the balance of the digital image unchanged or at least minimally affected. For example, the image shown in FIG. 8 contains detail in the white shirt and faces which is superior to that of FIG. 3B.

Note that while this embodiment has been described in regard to a digital image input, various modifications to the embodiment contained herein may be performed without substantially deviating from the present embodiment. For example, it would be possible to perform techniques similar to those contained within this embodiment in a standard analog printer, especially one containing an LCD as a masking unit such as described in copending U.S. patent application Ser. No. 09/643,544, entitled "System and Method for Light Falloff Compensation in an Optical System", filed Aug. 22, 2000 in the names of A. Gallagher and E. Gindele, and incorporated herein by reference.

Figure 9:
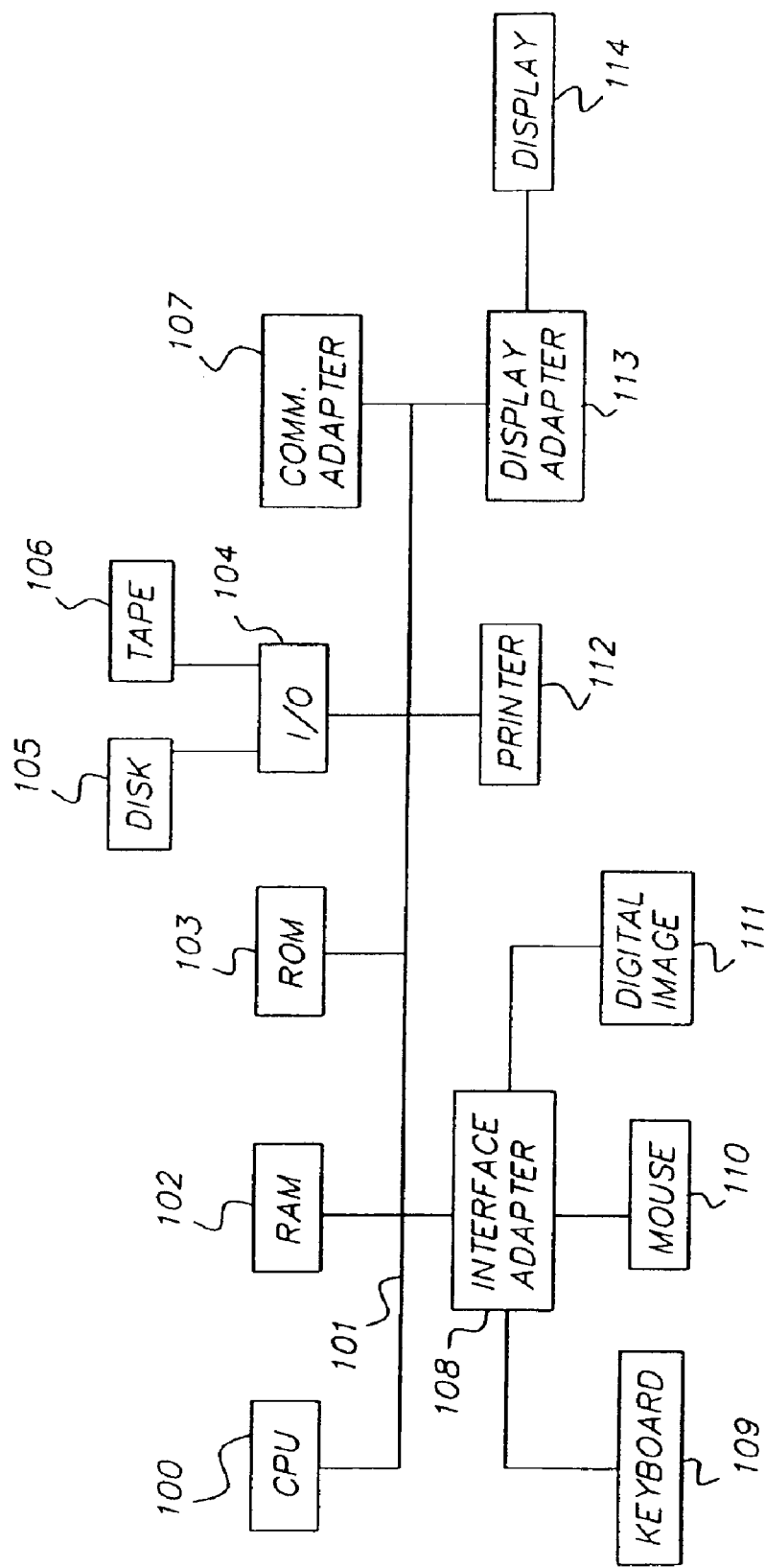
FIG. 9 is a block diagram of a computer system for implementing the present invention.

While the overall methodology of the invention is described above, the invention can be embodied in any number of different types of systems and executed in any number of different ways, as would be known by one ordinarily skilled in the art. For example, as illustrated in FIG. 9, a typical hardware configuration of an information handling/computer system in accordance with the invention preferably has at least one processor or central processing unit (CPU) 100. The CPU 100 is interconnected via a system bus 101 to a random access memory (RAM) 102, a read-only memory (ROM) 103, an input/output (I/O) adapter 104 (for connecting peripheral devices such as disk units 105 and tape drives 106 to the bus 101), a communication adapter 107 (for connecting the information handling system to a data processing network), a user interface adapter 108 (for connecting peripherals 109, 110, 111 such as a keyboard, mouse, digital image input unit (e.g., a scanner), microphone speaker and/or other user interface device to the bus 101), a printer 112 and a display adapter 113 (for connecting the bus 101 to a display device 114). The invention could be implemented using the structure shown in FIG. 9 by including the inventive method within a computer program stored, e.g., on the storage device 105. Such a computer program would act on a series of image frames supplied through the interface adapter 108 or the network connection 107, or stored on the disk unit 105. The system would then automatically produce the desired falloff compensated digital image on the display 114, through the printer 112 or back to the network 107.

The invention has been described in detail with particular reference to certain preferred embodiments thereof, but it will be understood that variations and modifications can be effected within the spirit and scope of the invention.

PARTS LIST

10 falloff compensator
20 falloff compensation information
30 balance value determiner
40 falloff compensator
50 entire digital image
60 central portion 70 scene balance algorithm
100 CPU
101 bus
102 RAM
103 ROM
104 I/O adapter
105 disk unit
106 tape drive
107 communication adapter
108 interface adapter
109 keyboard
110 mouse
111 digital image input unit
112 printer
113 display adapter
114 display device

What is claimed is:

1. An image processing method for compensating for light falloff in a digital image, said method comprising the steps of:
   providing an input digital image comprised of image pixels;
   providing individual compensation values to correct light falloff in one or more of the image pixels, whereby the individual compensation values induce a balance change in the digital image;
   determining a balance value for correcting the balance change of the digital image; and
   applying the individual compensation values and the balance value to said one or more pixels of the input digital image to provide a corrected image having compensation for light falloff with minimal change to the light balance.

2. The method as claimed in claim 1 wherein the step of providing individual compensation values comprises the steps of:
   providing falloff compensation information which varies depending on location within the digital image; and
   using the falloff compensation information to generate individual compensation values for said one or more pixels.

3. The method as claimed in claim 2 wherein the step of determining a balance value uses the falloff compensation information to determine a balance value.

4. The method as claimed in claim 1 wherein the step of providing individual compensation values comprises the steps of:
   providing a falloff compensation mask which varies depending on location within the digital image; and
   using the falloff compensation mask to generate individual compensation values for said one or more pixels.

5. The method as claimed in claim 4 wherein the step of determining a balance value uses the falloff compensation mask to determine a balance value.

6. The method as claimed in claim 1 wherein the step of determining a balance value comprises the steps of applying the individual compensation values to said one or more pixels of the input digital image to provide an intermediate corrected image and computing the balance value from the difference of the mean intensity of the central portions of the input digital image and the corrected digital image.

7. An image processing method for compensating for light falloff in a digital image, said method comprising the steps of:
   providing a digital image comprised of image pixels;
   providing falloff compensation information which varies depending on location within the digital image;
   using the falloff compensation information to generate an individual compensation value for one or more of the image pixels;
   determining a balance value from the falloff compensation information; and
   applying the individual compensation value and the balance value to said one or more pixels of the digital image to provide a corrected image having compensation for light falloff with minimal change to the light balance.

8. A method as claimed in claim 7 wherein the step of applying the individual compensation value to said pixels is additive.

9. A method as claimed in claim 7 wherein the step of applying the individual compensation value to at least one pixel value is multiplicative.

10. A method as claimed in claim 7 wherein the step of determining a balance value from the falloff compensation information is accomplished by determining the average of at least two individual compensation values.

11. The method as claimed in claim 10 wherein the said at least two individual compensation values correspond to adjacent and centrally located locations within the digital image.

12. The method as claimed in claim 11 wherein the balance value is determined by using an average of between 25% to 45% of the individual compensation values.

13. An image processing method for compensating light falloff in a digital image, said method comprising the steps of:
   providing a digital image comprised of image pixels;
   providing a falloff compensation function;
   providing a parameter value related to the falloff compensation function that refers to the relative amount of correction applied to the image pixels;
   using the falloff compensation function and the parameter value to generate individual compensation values for one or more of the image pixels;
   determining a balance value from the falloff compensation function and the parameter value; and
   applying the individual compensation values and the balance value to said one or more image pixels of the digital image.

14. An image processing method for compensating for light falloff in a digital image, said method comprising the steps of:
   providing a digital image comprised of image pixels;
   providing a falloff compensation mask;
   using the falloff compensation mask to generate an individual compensation value for one or more of the image pixels;
   determining a balance value from the falloff compensation mask; and
   applying the individual compensation value and the balance value to said one or more image pixels of the digital image.

15. A computer program product for compensating for light falloff in an input digital image comprised of image pixels, said computer program product comprising: a computer readable storage medium having a computer program stored thereon for performing the steps of:
   providing individual compensation values to correct light falloff in one or more of the image pixels, whereby the individual compensation values induce a balance change in the input digital image;
   determining a balance value for correcting the balance change of the input digital image; and applying the individual compensation values and the balance value to said one or more pixels of the input digital image to provide a corrected image having compensation for light falloff with minimal change to the light balance.

16. The computer program product as claimed in claim 15 wherein the step of providing individual compensation values comprises the steps of:

provided falloff compensation information which varies depending on location within the digital image; and using the falloff compensation information to generate individual compensation values for said one or more pixels.

17. The computer program product as claimed in claim 16 wherein the step of determining a balance value uses the falloff compensation information to determine a balance value.

18. The computer program product as claimed in claim 15 wherein the step of providing individual compensation values comprises the steps of:

providing a falloff compensation mask which varies depending on location within the digital image; and using the falloff compensation mask to generate individual compensation values for said one or more pixels.

* * * * *

UNITED STATES PATENT AND TRADEMARK OFFICE
CERTIFICATE OF CORRECTION

PATENT NO. : 6,940,546 B2  Page 1 of 1
DATED : September 6, 2005
INVENTOR(S) : Gallagher It is certified that error appears in the above-identified patent and that said Letters Patent is hereby corrected as shown below:

Column 9,
Line 55, after "6." delete "The method as claimed in claim 1" and insert the following:

-- An image processing method for compensating for light falloff in a digital image, said method comprising the steps of:
providing an input digital image comprised of image pixels;
providing individual compensation values to correct light falloff in one or more of the image pixels, whereby the individual compensation values induce a balance change in the digital image;
determining a balance value for correcting the balance change of the digital image; and
applying the individual compensation values and the balance value to said one or more pixels of the input digital image to provide a corrected image having compensation for light falloff with minimal change to the light balance; --.

Column 10,
Line 16, after "10." delete "A method as claimed in claim 7" and insert the following:

-- An image processing method for compensating for light falloff in a digital image, said method comprising the steps of:
providing a digital image comprised of image pixels;
providing falloff compensation information which varies depending on location within the digital image;
using the falloff compensation information to generate an individual compensation value for one or more of the image pixels;
determining a balance value from the falloff compensation information; and
applying the individual compensation value and the balance value to said one or more pixels of the digital image to provide a corrected image having compensation for light falloff with minimal change to the light balance; --.

Signed and Sealed this

Twenty-eighth Day of March, 2006

JON W. DUDAS
*Director of the United States Patent and Trademark Office*